G. M. ENGLE.
RAISED SILL FOR EXPRESS AND BAGGAGE TRUCKS.
APPLICATION FILED SEPT. 12, 1916.
1,219,274.                                    Patented Mar. 13, 1917.
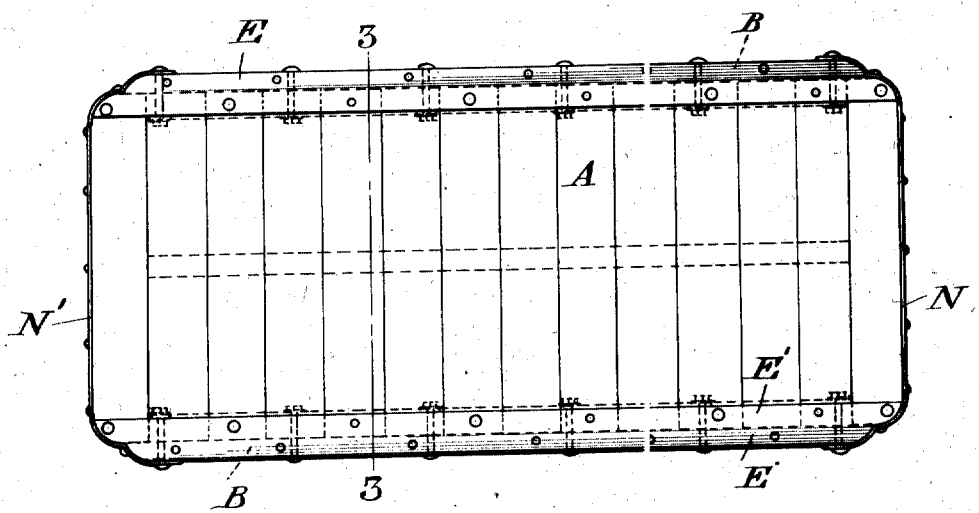
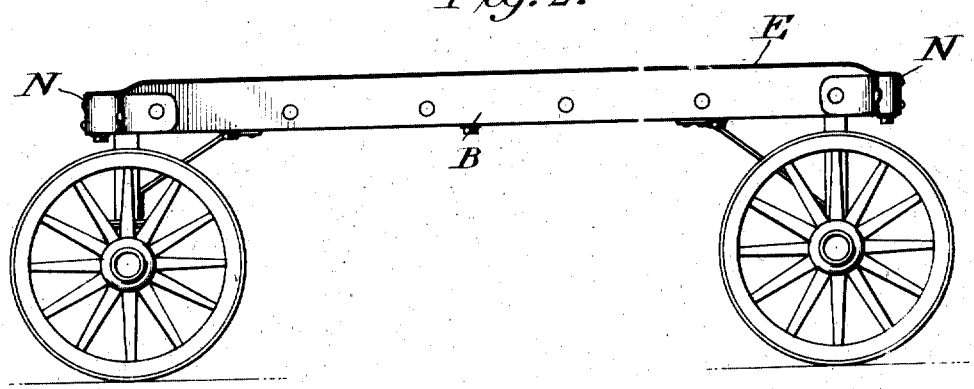
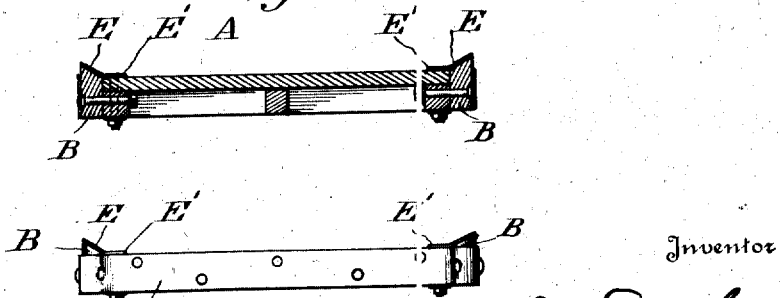
Witness
Fenton N. Felt
Inventor
George M Engle
By A. L. Hough
Attorney

UNITED STATES PATENT OFFICE.

GEORGE MADISON ENGLE, OF BEEVILLE, TEXAS.

RAISED SILL FOR EXPRESS AND BAGGAGE TRUCKS.

1,219,274.  Specification of Letters Patent.  Patented Mar. 13, 1917.

Application filed September 12, 1916. Serial No. 119,607.

*To all whom it may concern:*

Be it known that I, GEORGE MADISON ENGLE, citizen of the United States, residing at Beeville, in the county of Bee and State of Texas, have invented certain new and useful Improvements in Raised Sills for Express and Baggage Trucks, of which the following is a specification, reference being had therein to the accompanying drawing.

This invention relates to new and useful improvements in attachments to express and baggage trucks and consists essentially in the provision of an extended raised sill and cap which may be attached to an ordinary truck after completion or while being built and consists of a simple and efficient device of this nature having various details of construction combinations and arrangements of parts which will be hereinafter fully described, shown in the accompanying drawings and then specifically defined in the appended claims.

My invention is illustrated in the accompanying drawings, in which:—

Figure 1 is a top plan view of a truck made in accordance with my invention.

Fig. 2 is an edge view.

Fig. 3 is a cross sectional view on line 3—3 of Fig. 1.

Fig. 4 is an end view.

Reference now being had to the details of the drawings by numeral, A designates the floor of the truck, of the usual construction, and B designates timbers which are of any suitable size and extending substantially the length of the truck body and to the side sills of each truck the strips are securely bolted or otherwise secured. It will be noted upon reference to the drawings that the upper surface of the strip is beveled, sloping toward the floor side. E designates an iron plate which has a beveled portion, conforming to the beveled upper surface of said strip, and a horizontal portion E' adapted to extend over the sill at the side of the floor of the truck to which said sill is fastened. End bands of metal, designated by letter N, are secured to the ends of the truck and overlap the ends of said strips to which they are securely fastened by screws or other suitable means.

By the provision of an attachment to a truck embodying the features of my invention, it will be noted that the body of the truck is not only given greater width than the ordinary truck but the outer edges are raised slightly which makes it safer for a load and also adds to the strength of the truck and its efficiency.

It will be noted that, by the simplicity of the attachment, it may be applied to trucks already in use or when the truck is being made.

What I claim to be new is:—

1. In combination with a baggage and express truck, strips secured to the opposite sides thereof and having their upper surfaces inclined toward the floor of the truck, and an angled plate secured to the inclined portion of said strip and to the upper surface of the floor of the truck.

2. In combination with a baggage and express truck, strips secured to the opposite sides thereof and having their upper surfaces inclined toward the floor of the truck, an angled plate secured to the inclined portion of said strip and to the upper surface of the floor of the truck, and metallic bands secured to the ends of the truck, overlapping and fastened to said strips.

In testimony whereof I hereunto affix my signature in presence of two witnesses.

GEORGE MADISON ENGLE.

Witnesses:
 FRANK NEWCOMB,
 A. W. KRUEGER.